（12）United States Patent
Zhuo et al.

(10) Patent No.: US 11,238,406 B1
(45) Date of Patent: Feb. 1, 2022

(54) DIGITAL INVENTORY AND INVENTORY TRANSFER ASSISTANT (71) Applicant: Wells Fargo Bank, N.A., San Francisco, CA (US)

(72) Inventors: Yi M. Zhuo, Monroe, NC (US); Lin-Tine David Li, Charlotte, NC (US); Robert Christian Brantley, Winston Salem, NC (US); Chris Gerard Baker, Mooresville, NC (US); H. Brock Kolls, Alpharetta, GA (US); Regina W. Timmons, Greensboro, NC (US); James Albert Foulis, Charlotte, NC (US); Tambra Nichols, Charlotte, NC (US)

(73) Assignee: Wells Fargo Bank, N.A, San Francisco, CA (US)

( * ) Notice: Subject to any disclaimer, the term of this patent is extended or adjusted under 35 U.S.C. 154(b) by 372 days.

(21) Appl. No.: 15/672,838

(22) Filed: Aug. 9, 2017

(51) Int. Cl.
G06Q 10/08 (2012.01)
G06Q 40/06 (2012.01)
G06F 3/0482 (2013.01)
G06F 3/0484 (2013.01)
G06F 9/54 (2006.01)
G06K 9/32 (2006.01)
G06F 16/2457 (2019.01)

(52) U.S. Cl.
CPC ....... *G06Q 10/0875* (2013.01); *G06F 3/0482* (2013.01); *G06F 3/04847* (2013.01); *G06F 9/542* (2013.01); *G06F 16/24573* (2019.01); *G06K 9/3241* (2013.01); *G06Q 40/06* (2013.01)

(58) Field of Classification Search
CPC ... G06Q 40/06; G06Q 10/0875; G06K 9/3241
See application file for complete search history.

(56) References Cited

U.S. PATENT DOCUMENTS

| 8,219,558 B1* | 7/2012 | Trandal ............... G06Q 10/087 707/736 |
| 8,493,442 B2 | 7/2013 | Fernandez et al. |
| 9,429,438 B2 | 8/2016 | Weng et al. |
| 9,443,414 B2 | 9/2016 | Scavezze et al. |
| 9,489,821 B2 | 11/2016 | King et al. |
| 9,710,615 B1* | 7/2017 | Morlen .................. G06F 21/10 |
| 2002/0161652 A1 | 10/2002 | Paullin et al. |

(Continued)

*Primary Examiner* — Florian M Zeender
*Assistant Examiner* — Whitney Poffenbarger
(74) *Attorney, Agent, or Firm* — Schwegman Lundberg & Woessner, P.A.

(57) ABSTRACT

A computer-implemented system and related method are provided for operating a digital inventory system. The method comprises receiving, from an imaging device, an image comprising an object and performing object recognition on the image to determine an object type of the object. The method further comprises determining when the object is to be added to an inventory database based on inventory rules stored in a memory of the digital inventory system. When these rules indicate that the object is to be added, the object is added to the inventory database. The method determines a value of the inventory object based on valuation information related to other objects of a same or similar object type. The value is associated with the inventory object. The inventory object is displayed along with its value on a computer display.

20 Claims, 4 Drawing Sheets (56) References Cited

U.S. PATENT DOCUMENTS

| | | | |
|---|---|---|---|
| 2003/0033205 A1* | 2/2003 | Nowers | G06Q 30/0605 |
| | | | 705/26.2 |
| 2011/0161117 A1* | 6/2011 | Busque | G06Q 20/3278 |
| | | | 705/4 |
| 2012/0101830 A1* | 4/2012 | Dholakiya | G06Q 30/0601 |
| | | | 705/1.1 |
| 2015/0046299 A1 | 2/2015 | Yan | |
| 2015/0081395 A1* | 3/2015 | Katz | G06Q 30/0269 |
| | | | 705/7.35 |
| 2016/0042402 A1 | 2/2016 | Gadre et al. | |
| 2016/0307150 A1 | 10/2016 | Rogers et al. | |
| 2017/0039511 A1* | 2/2017 | Corona | F25D 29/00 |
| 2017/0076393 A1* | 3/2017 | Cohen | G06Q 40/08 |
| 2017/0372165 A1* | 12/2017 | Jouhikainen | G06K 9/4628 |
| 2018/0260768 A1* | 9/2018 | Ng | G06Q 20/203 |
| 2018/0330206 A1* | 11/2018 | Shyshkov | G06K 9/00456 |
| 2019/0073732 A1* | 3/2019 | Bitan | G06Q 50/186 |

* cited by examiner

DIGITAL INVENTORY AND INVENTORY TRANSFER ASSISTANT

TECHNICAL FIELD

A system and method are provided for operating a digital inventory and inventory transfer assistant.

BACKGROUND

Managing an inventory of resources that are to be transferred upon the occurrence of some event may be time consuming and require a great deal of effort, particularly if there is a significant amount of time between the acquisition of a resource and the time it is to be transferred. Over time, the inventory may change, but keeping up with transfer instructions for a future transfer may be a problem.

Such a situation may occur when, for example, a transferor desires to transfer their assets via transfer instructions to various transferees under certain conditions. In these types of situations, managing the resources and ensuring they are accounted for in the instructions for future transfer may become complex and difficult to keep updated.

SUMMARY

A computer-implemented method is provided for operating a digital inventory system. The method comprises receiving, from an imaging device, an image comprising an object and performing object recognition on the image to determine an object type of the object. The method further comprises determining, with a processor of the digital inventory system, when the object is to be added to an inventory database that resides in a memory of the digital inventory system based on inventory rules stored in a memory of the digital inventory system. When the inventory rules indicate that the object is to be added, the object is added to the inventory database making the object an inventory object. The method determines a value or range of values of the inventory object based on valuation information related to other objects of a same or similar object type. The value or range of values is associated with the inventory object. The inventory object is displayed along with its value or range of values on a computer display.

A system is also provided for operating a digital inventory, comprising a hardware processor, a storage device comprising a nonvolatile memory and connected to the hardware processor. The storage device comprises an inventory database. An imaging device is further connected to the hardware processor and the storage device. The hardware processor comprises instructions that, when executed on the hardware processor, cause the system to receive, from the imaging device, an image comprising an object. Object recognition is performed on the image to determine an object type of the object. The processor further determines when the object is to be added to the inventory database based on inventory rules stored in the storage device. When the inventory rules indicate that the object is to be added, the system to adds the object to the inventory database making the object an inventory object. The processor further determines a value or range of values of the inventory object based on valuation information related to other objects of a same or similar object type, associates the value or range of values with the inventory object, and displays the inventory object along with its value or range of values on a computer display.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

DETAILED DESCRIPTION

In order to help a user maintain an inventory of resources, such as assets of an estate, that are to be transferred at some future date, a system and related method are provided that helps gather and organize information related to those resources and those to whom those resources are to be transferred at the future date. An imaging device coupled with an object recognition utility help to collect information about objects in an area surrounding the imaging device.

An intelligent set of rules may be provided to sort through which of the objects captured by the imaging device are to be put into an inventory database. Then, a list of future recipients for the inventoried objects is provided, and an association is made between the inventoried objects and the future recipients (transferees). Various tools may be provided for assessing the value and displaying information associated with the objects in the inventory database.

Figure 1:
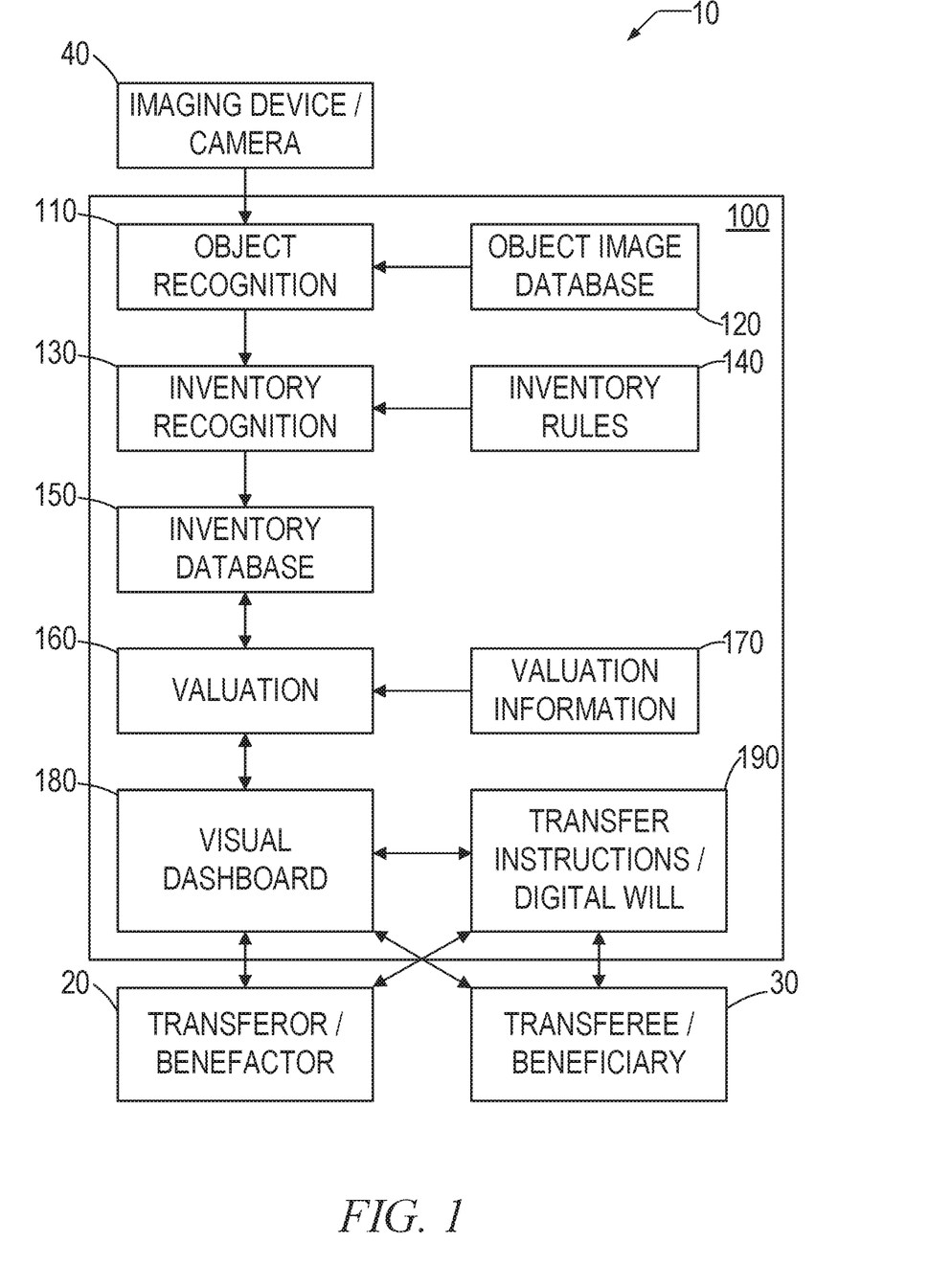
FIG. 1 is a block diagram that illustrates an implementation of a digital inventory and inventory transfer assistant.

FIG. 1 is a block diagram that illustrates one implementation of a digital inventory and inventory transfer assistant (DIITA) system 10, which is a technical system that includes the DIITA 100 along with external entities that interface with it, for example, the transferor 20, transferee 30, and an imaging device 40. It also includes networks that interconnect the entities and enable communication between them.

An implementation described herein is the application of such a DIITA system 10 to a system that deals with resources that are assets and resource transfers that are asset transfers, and in particular, with a transferor who is a benefactor who wishes to transfer assets to transferees who are beneficiaries at some time in the future via transfer instructions that are contained in a will.

However, this is only one implementation, and the technical DIITA system is not limited to an application involving a transfer of assets between a transferor who is a transferor 20 and transferees who are transferees 30, but could involve any resource inventory system and resource transfer between entities who wish to collaborate on the nature and aspects of the resource transfers. The types of assets may be numerous, and include, for example, existing real estate property, with potential linkages to external data sources used to detail or value the property, stocks, bonds, accounts, art, jewelry, animals, private companies, and even items such as contacts. Furthermore, the components illustrated in DIITA system 10 may be distributed across computing systems (logically or geographically) and may be combined or separated, according to various example implementations.

In one implementation, a transferor 20 has a number of resources/assets that she wishes to transfer to one or more transferees 30 upon the occurrence of an event. Typically, the event would be the death of the transferor 20, and in known systems, the instrument for transferring the assets would be a will. However, the event may be anything and does not necessarily have to relate to the transferor 20. For example, the transfer could occur when a transferee 30 achieves some goal, such as completing college or getting married.

The digital inventory and inventory transfer assistant 100 simplifies creating and updating a digital inventory which comprise the transferor's 20 assets, and makes organizing the transfer of the resources to transferees 30 easy. In one implementation, an imaging device(s) 40, such as a camera, may be placed in a location in which potential assets may be located. For example, the imaging devices may be placed in various rooms in a residence, in a garage, in a rear porch with a view to a back yard, etc. The imaging devices 40 may be permanently mounted or temporarily placed in a particular location (or carried around by an individual) so that it may capture images in a surrounding area.

The device 40 is designated as an imaging device here, but device 40 is not limited to being an imaging sensor and could also be any form of a sensor, such as a radio frequency identification (RFID) sensor, and objects could be tagged with RFID tags, or signal detectors to detect cell phones, computer equipment, etc. It may be directly wired to an on-sight computer system or storage unit, or comprise a wireless connection such as Bluetooth or Wi-Fi. The images may be stored locally or communicated to an off-site storage facility, such as a cloud-based storage.

At this point, a use case is introduced in order to better illustrate the concepts discussed. Nancy is a mother who has two children, Winston and Ava, to whom she wishes to leave an inheritance. She owns a ranch house with several rooms and a garage in which a sedan is parked. She also has a modest art collection. In this use case, Nancy mounts a camera as an imaging device 40 in her living room so that it can scan for various objects that may be of value and may possibly be included in Nancy's will.

Once the imaging device 40 is located in an area of interest, it captures images within its viewing area. An image may be captured on demand, periodically, or according to some predefined event. In this use case, Nancy has instructed the camera 40 to operate once per month, and now it takes the first picture of the living room.

Once the image is captured, an object recognition process 110 may be run on the image, which extracts objects from the image utilizing an object image database 120 (or may be fed into a machine learning model) and determines an object type of the recognized object. Although FIG. 1 shows the object image database as being part of the DIITA 100, it may also be located external to it. In the use case, the camera 40 takes a picture of the living room and submits the image to the object recognition process 110. The object recognition process 110 identifies a number of objects within the living room by determining their object types, including a framed painting on the wall. The object type is defined herein as a descriptor that may be used to identify a particular instance of an object in the image. The object type may be very broad or very narrow, and may include any number of object type or descriptor elements.

For example, at a very general level, the above-described painting may simply have an object type of "painting, framed", if that is all that can be discerned about this particular painting. However, the object type could be much more specific, depending on the nature of the painting. For example, if the painting is Picasso's "The Weeping Woman", then the object type could be "painting, framed, Picasso, The Weeping Woman", which would permit a much more accurate assessment to be made of the object. In this instance, the imaging device may not be sophisticated enough to distinguish between an original and a print, and thus, the transferor may need to enter additional information to be associated with the object, such as "original" or "print".

The object recognition process 110 passes the list of recognized objects and object types to an inventory recognition process 130, which may utilize inventory rules 140 to determine if a particular object is to be included in an inventory database 150. The inventory rules 140 might identify art as something that is to be included in the inventory, whereas the inventory rules 140 may indicate that keys recognized by the object recognition process 110 are not to be included in the inventory.

The inventory rules 140 may be simple in just categorizing things that should or should not be included in the inventory database. However, they may be more complex and utilize artificial intelligence (AI) techniques. For example, the presence of a particular object for a period of time may be required to determine whether it should belong in the inventory database 150. Here, a second image may be captured, and if the object is still present in the second image after a predetermined amount of time has passed, the object may be added to the inventory database 150. In the use case, the object recognition process 110 may identify a fur coat hanging next to the living room door. However, it cannot tell whether the coat belongs to the owner or a visitor. If the coat is present in the next picture taken days, weeks, or months later, then the inventory rules 140 may indicate that the coat is a new asset and that it is to be included in the inventory database 150. In contrast, if the coat is not present in subsequent pictures, then the inventory rules 140 may indicate that the coat is not a new asset.

The inventory rules 140 may be created using any form of data entry or user interface tools. For example, the inventory rules could be entered as a text document in which various categories of objects are identified as being either an object that should go into the inventory database 150 or one that should not. More sophisticated rules could be entered using logic statements, such as multiple if-then statements, while statements, or other forms of logic statements. For example, a rule may be created that any object identified as jewelry may be placed in the inventory database 150 unless a receipt exists for the jewelry and the receipt indicates a dollar amount of less than $35.00. The inventory rules 140 may be manually entered and/or may be automatically derived from existing inventory rules 140.

Once an object is added to the inventory database 150 (defined herein as an inventory object), an automated valuation process 160 may attempt to provide an estimated value to the object, and may utilize valuation information 170 in order to do so. The automated valuation process 160 may make use of automated web searches, including search engines and bots, application program interface (API calls) to applications having access to other databases or sites with valuation information.

As with the object image database 120, the valuation information 170 may reside within the DIITA 100 or be external to it, with the valuation process 160 accessing the valuation information 170 over the network. In many cases, the valuation process 160 may be able to make only a very general estimate or none at all, and request assistance for a more accurate estimate.

By way of example, Nancy's painting is not a famous painting and was not painted by a well-known artist. However, the valuation process 160 recognizes the frame, and based on comparables obtained from an on-line seller, determines that the frame is worth approximately $100. Since the valuation process 160 could not estimate the value of the painting, it may flag the object in the inventory database 150 for assistance. The valuation process 160 could look for objects of a same or of a similar type, and the value may be expressed as a single value or a range of values, depending on how accurately a value determination can be made. In some instances, intervention by the transferor 20 may be utilized to add additional object metadata to assist in the valuation process 160. As defined herein, a similar object type is an object type that shares one or more descriptor items with the object type. For example, a painting having a descriptor "painting" may be a similar object type of an object type of "framed, painting". Additionally, a similar object type may share one or more descriptor items that are related synonyms of an object type. For example a "print" may be considered a similar object type to a "painting" object type. A metric that defines a degree of similarity may be provided based on various known techniques and a degree of similarity may be assessed using known similarity measure techniques, such as clustering.

The valuation process 160 may also make use of interpolation to determine an approximate value or range. For example, although a specific value for a 2007 Honda Accord may not be found based on an automated search, values for 2005 and 2010 Accords may be located, and the value of the 2007 Accord interpolated from the actual located values.

A notification may be sent to the transferor 20, or any other appraiser, indicating that a value estimate is needed for an object—in the use case, the painting. The notification may take any form, and include an email message, text message, or simply a viewable designation that can be seen when interacting with the inventory database 150, such as a flag. Another example in the use case is for a camera placed in the garage. The object recognition process 110 is able to determine that there is a 2013 Ford Mustang parked in the garage, and is able to determine that the vehicle is in relatively good shape. The valuation process 160 can make an estimated valuation of $11,000 by accessing the on-line Blue Book database. However, the vehicle may be flagged in the inventory database 150 as benefitting from obtaining follow-up information, such as mileage and certain interior options that the camera 40 cannot determine. Once the additional information is provided, the valuation process 160 may be able to make a more accurate assessment.

The transferor 20 may interact with the system using, e.g., a web-based interface or by operating a client-side application on a mobile device that interfaces with a server-side application on a network server or in a cloud. After the transferor logs on to the system, the system may present to the transferor 20, on a display, objects that are in the inventory database 150 or that are to be designated as going in the inventory database 150. Additionally, existing transferees 30 may be displayed and/or entry fields or the like to add additional transferees 30 or edit (including deleting) transferees 30. The transferees 30 may be associated with objects in the inventory database 150 by, for example, dragging and dropping objects to transferees 30 and vice versa.

The display may further provide an indication of inventory database 150 objects valuations identified by the valuation process 160. Such values may be displayed as overlays or adjacent to the objects on the screen. In one implementation, the inventory database 150 objects may be presented on the display in context. For example, an automobile may be shown in a garage, a painting shown on a wall of a living room, and so on.

The valuation process 160 may also determine value by accessing financial information related to, e.g., a purchase, provided access has been granted to financial records. For example, if Nancy trades in her 2013 Ford Mustang for a new 2017 Ford Mustang, the valuation process 160 may look at bank account information to determine the price paid for the new vehicle and include that valuation information in the inventory database 150. Thus, buying events may trigger the valuation process 160 to provide a value to the object in the inventory database 150. In any case, the valuation process 160 comprises associating the value or range of values with the range of values.

In some instances, objects may have more value for sentimental reasons as opposed to objective value in the marketplace. For such items, the value could be left blank, or some indication could be allowed for indicating a sentimental value (e.g., in dimensionless units, such as a scale from zero to ten). In this way, some metric could be provided when attempting to determine how objects in the inventory database should be split between transferees 30. In the use case, a photograph album that was owned by Nancy's father may be such an object, which the benefactor could assign an eight in sentimental value to.

Other metadata besides value can be added to objects in the inventory database 150. For example, additional object metadata may include a note describing a particular memory may be attached, some comments on the object's origins, or prospective object buyer metadata describing buyers who might be interested in the object if the beneficiary is not. Tax related data containing information related tax consequences of a sale may be included, or even informal instructions not part of the digital will, e.g., care instructions, may be included.

To assist in viewing and organizing objects in the inventory database 150 into transfer instructions 190, which may be in the form of a digital will, a user interface, such as a dashboard 180, may be provided. The dashboard 180 may comprise display regions for displaying images of objects and other image data, text regions for displaying text, controls that permit interacting with other displayed data and facilitate making associations between entities, such as objects and transferees or balancing total asset value between transferees 30. The system may provide a utility for determining balancing information for balancing total asset values for each of the transferees provide (potential) reallocations of inventory objects to different ones of the transferees based on the determined balancing information.

The digital will 190 may simply be an electronic word processing document. However, it may be beneficial to permit a tagging of the digital will 190 to assist in the retrieval and modification of various will sections. The tagging could include semantic tags as additional transfer instruction metadata that identify sections of the will, beneficiaries of the will (and their respective assets, including a compensation statement), access control information for various portions of the will, a description of the assets, etc.

The access limitations may be provided by individual, i.e., at an individual level, or for a group or class, for example, children.

It may be further possible to implement electronic signing of the digital will 190. For example, once the assets have been identified and associated with transferees 30, provisions may be made for attaching an electronic signature to the digital will 190, along with electronic signatures of any others needed, such as witnesses. Various mechanisms may be utilized to authenticate the electronic signers, such as a username and password, biometric techniques, and so on.

The dashboard 180 may allow the transferor 20 to tag each object in the inventory database 150 with metadata identifying one or more transferees 30, and then, using, for example, a will generator (not shown), generate a digital will 190, or at least parts of the digital will 190, using the metadata information in the inventory database 150. The transferees 30 may be identified using a transferee identifier, which may be a name, social security number, or other identifier that uniquely identifies the transferee 30. The dashboard 180 can also allow for entry in the digital will 190 of additional data, like conditional transfer information and the like. The dashboard 180 may also provide an indication of total value arranged by beneficiary (or any other data field) to assist the transferor 20 in evenly dividing her assets between transferees 30 and/or to make suggestions for the assigning.

The transferees 30 may also be able to access the dashboard 180 in order to view or possibly add or edit metadata associated with the inventory database 150 objects and/or portions of the digital will 190. When a transferee 30 is tagged as a future recipient of an object by association information provided to the system, the transferee 30 may be provided with notification of this event via some form of communications, such as an email or other mechanisms discussed herein. This may then provide the transferee 30 a chance to also edit associated metadata information or communicate with the transferor 20 regarding the assignment. However, such access may be conditional upon access control limitations put in place by the transferor 20. The transferees 30 may use the dashboard 180 to perform an asset review to confirm various aspects associated with the objects. In one implementation, the DIITA 100 may review and present or suggest other potential beneficiaries as well, such as relatives, charitable organizations, etc. It may determine other possible beneficiaries from external data sources, such as social media (e.g., Facebook), public records, and the like.

In one implementation, a virtual reality (VR) or an augmented reality (AR) component may be added in order to allow a transferor 20, transferee 30, or anyone else to walk through a given area and see metadata associated with the objects overlaid or near the object, subject to access restrictions described herein. For example, Winston may walk through his mother's house with a pair of AR glasses on, connected with an application in the DIITA 100, and observe the painting in the living room. The AR application could show him that he is the currently designated beneficiary for the painting along with its estimated value and a potential dealer who might be interested in buying the painting if Winston does not want to keep it. This form of interface could enhance the review and assignment process for items contained in the inventory database 150 (or provide a red flag if certain items are not in the inventory database 150 or are not properly/fully tagged).

FIG. 1 shows the various components of the DIITA 100 within a block, however this does not imply that the various components all need to reside on a single device. Various components could run on different computing/storage devices, particularly when implemented in a client-server or cloud-based architecture.

Figure 2:
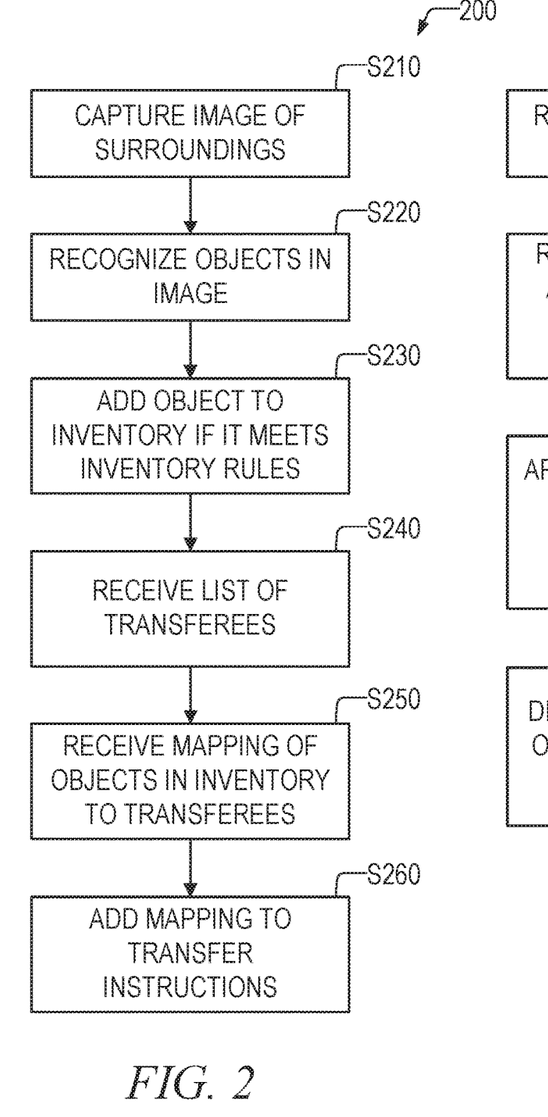
FIG. 2 is a flowchart that illustrates an example process for using the digital inventory relating primarily to transferor activities.

FIG. 2 is a flowchart that illustrates an example process 200 of the DIITA's 100 interactions with a transferor 20. In operation S210, the imaging device 40 captures one or more images of its surroundings and may transfer the images over a wired or wireless network to a storage device. As described above, the capture may take place periodically or according to a predefined criteria. The capture may also be a one-time photograph of a particular location.

In operation S220, the stored images may be subject to an object recognition process 110 that attempts to recognize various objects in the captured image with those in the object image database 120. Any known image matching algorithms may be utilized, and both recognized and unrecognized objects may be presented to a person, such as the transferor 20, for review and correction. A web-based interface to the DIITA 100 could display the image along with text descriptions of the objects found in the image. The transferor 20 could then verify the accuracy of the text descriptions and correct them if inaccurate, add tags to the descriptions, add descriptions if they are missing, or possibly indicate that an object is not to be placed in the inventory database.

In operation S230, the recognized objects are subjected to an inventory recognition process 130 that takes into account stored inventory rules 140 to determine if the object is to be added to the inventory database 150. As noted above, the inventory rules 140 can be as simple as designating particular types of objects for inclusion or exclusion, or may be more sophisticated in using, for example, a duration time to assess whether the object is properly associated with the transferor or not. The operation S230 could further present a listing of objects to a person, such as the transferor 20, who could review the objects that are identified as belonging in the inventory database 150 and those that are not. The transferor 20 could then correct any mis-designated objects.

In operation S240, the DIITA 100 receives a list of transferees 30 from the transferor. The timing for receipt of this list or of any transferee 30 in the list is not important as long as it occurs prior to an assignment of an object to a particular transferee. The transferor 20 may enter information about the transferees 30 using known data entry procedures, such as typing into form fields on a web-based form.

In operation S250, the DIITA 100 receives a mapping of objects in the inventory database 150 to transferees 30. As discussed above, this may be performed by the transferor 20 interacting with a web page display having both inventory database 150 objects and transferees 30 displayed, and could be implemented by, for example, dragging and dropping an object onto a transferee 30 or vice versa to establish an association.

In operation S260, the mapping of objects to transferees 30 may then be used as a basis for creating or updating transfer instructions 190 that may be in the form of a digital will. This may be an automated or semi-automated procedure in which the association between an object and a transferee 30 is converted into the language of a digital will to indicate how and under what conditions the object is transferred to the transferee 30. Although a complete digital will 190 likely requires additional input on the part of the transferor 20, the procedure for automatically converting the inventory database 150 into parts of the digital will 190 can save a significant amount of time and effort.

Figure 3:
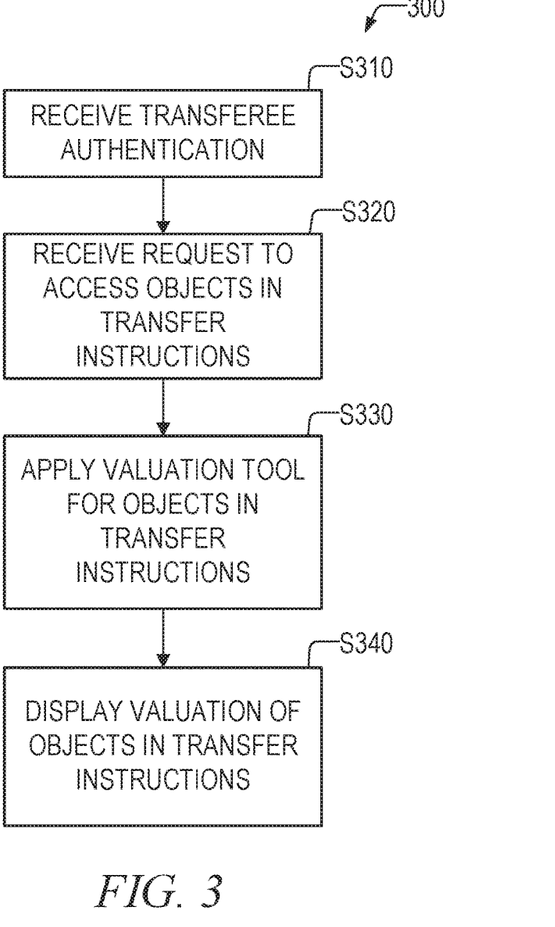
FIG. 3 is a flowchart that illustrates an example process for using the digital inventory relating primarily to transferee activities.

FIG. 3 is a flowchart that illustrates an example process 300 of the DIITA's 100 interactions with a transferee 30. In operation S310, the DIITA 100 receives input authenticating a particular transferee 30 to access the system. An authentication procedure may also be used for the transferor 20. As noted above, authentication information may be provided in the form of the user entering a username and password to access a web-based application, but could include use of biometric information, etc.

Once the transferee 30 has been authenticated, the transferee 30 may request to review objects that he is authorized to view either in the inventory database 150 or portions of the transfer instructions 190 (digital will). The request is received by the DIITA 100 and accesses the relevant objects/digital will portions and may display them, e.g., on a web-page to the transferee. The display may present any additional metadata that has been associated with the object that the transferee 30 is authorized to view.

In operation S330, the valuation process 160 may access information from the valuation information 170 to provide a current value for objects that are presented on the display for the transferee 30. As noted above, the valuation process may access external sources, such as merchants' web sites, auction and other sales sites, on-line catalogs, and appraisal web sites (to obtain appraisal information) to determine values of objects, and may present a possible range of prices based on how well it is able to determine actual prices from accessed sources. The valuation process 160 may be utilized by the transferor as well.

In operation S340 the object values may be displayed to the transferee 30. In one implementation, the objects may be presented as pictures on a web page and the value along with other relevant information is displayed as text adjacent to the picture. In another implementation, the value may be displayed on top of the object. The objects may also be show in the context that they are located in. For example, a vehicle in a garage may be shown in the garage, with the value superimposed on the car or located to the side of the car.

General Computer and Network Architecture

Figure 4:
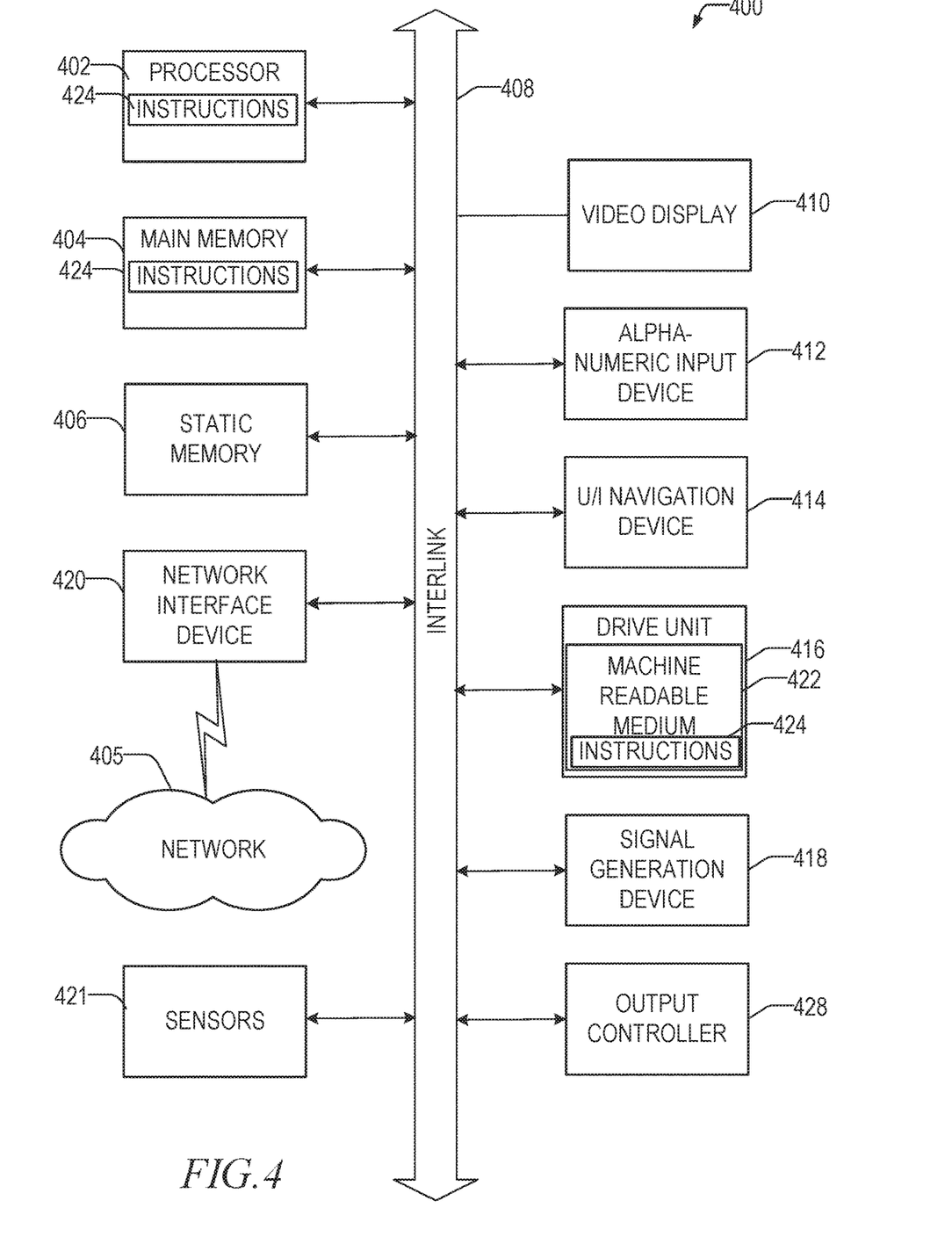
FIG. 4 is a block diagram illustrating a machine that may be a computer on which various processes described herein may be performed.

To describe some configurations in greater detail, reference is made to examples of hardware structures and interconnections usable in the designs of the present disclosure. FIG. 4 is a block diagram illustrating a machine that may be a computer on which various processes described herein may be performed, such as a processor of the DIITA system 100 described above. The machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example described herein, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB)), parallel, or other wired or wireless (e.g., infrared(IR), near field communication (NFC), etc.) controller connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 424 may further be transmitted or received over the communications network 405 using a transmission medium via the network interface device 420. The term "transmission medium" is defined herein to include any medium that is capable of storing, encoding, or carrying instructions for execution by the machine, and includes digital or analog communications signals or other medium to facilitate communication of such software.

The machine 400 may communicate with one or more other machines 400 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), or any other way of transferring data between machines 400. In an example, the network interface device 420 may include one or more physical jacks (e.g., Ethernet, coaxial, or phone jacks) or one or more antennas to connect to the communications network 426.

In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 420 may wirelessly communicate using Multiple User MIMO techniques.

A wide variety of computing devices may constitute a machine 400, as described herein. The following list includes a variety of devices that may fit the definition of a machine 400; a personal data assistant (PDA), a cellular telephone, including a smartphone, a tablet computing device, a laptop computer, a desktop computer, a workstation, a server computer, a mainframe computer, and the like.

Figure 5:
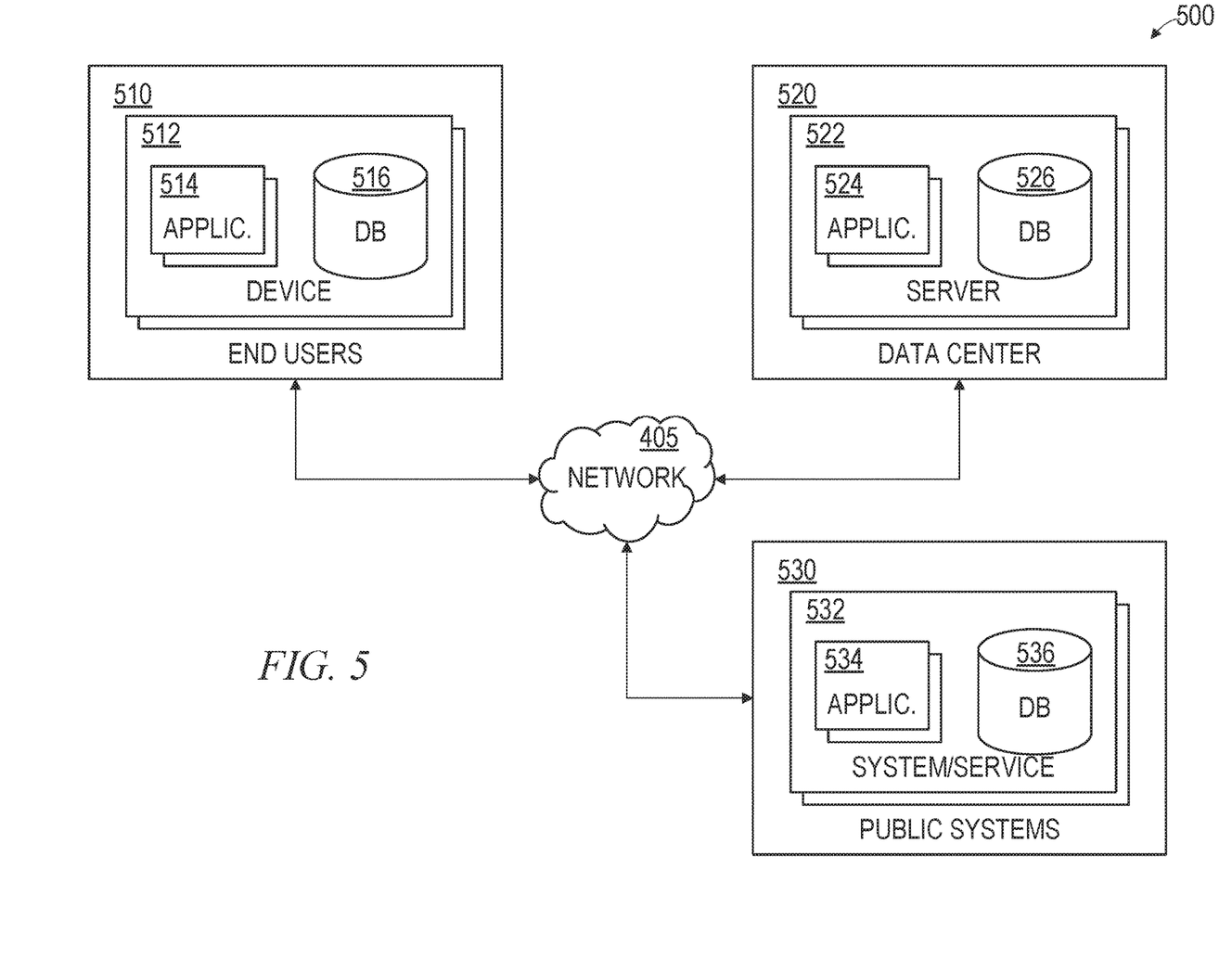
FIG. 5 is a block diagram of a distributed computing system.

FIG. 5 is a block diagram of a distributed system 500 that may include a client-server architecture or cloud computing system within which the DIITA system 100 may be run. Distributed system 500 may have one or more end users 510. An end user 510 may have various computing devices 512, which may be machines 400 as described above. The end-user computing devices 512 may comprise applications 514 that are either designed to execute in a stand-alone manner, or interact with other applications 514 located on the device 512 or accessible via the network 405. These devices 512 may also comprise a data store 516 that holds data locally, the data being potentially accessible by the local applications 514 or by remote applications.

The system 500 may also include one or more data centers 520. A data center 520 may be a server 522 or the like associated with a business entity that an end user 510 may interact with. The business entity may be a computer service provider, as may be the case for a cloud services provider, or it may be a consumer product or service provider, such as a retailer. The data center 520 may comprise one or more applications 524 and databases 526 that are designed to interface with the applications 514 and databases 516 of end-user devices 512. Data centers 520 may represent facilities in different geographic locations where the servers 522 may be located. Each of the servers 522 may be in the form of a machine(s) 400.

The system 500 may also include publicly available systems 530 that comprise various systems or services 532, including applications 534 and their respective databases 536. Such applications 534 may include news and other information feeds, search engines, social media applications, and the like. The systems or services 532 may be provided as comprising a machine(s) 400.

The end-user devices 512, data center servers 522, and public systems or services 532 may be configured to connect with each other via the network 405, and access to the network by machines may be made via a common connection point or different connection points, e.g, a wireless connection point and a wired connection. Any combination of common or different connections points may be present, and any combination of wired and wireless connection points may be present as well. The network 405, end users 510, data centers 520, and public systems 530 may include network hardware such as routers, switches, load balancers and/or other network devices.

Other implementations of the system 500 are also possible. For example, devices other than the client devices 512 and servers 522 shown may be included in the system 500. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 522.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products.

Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like. The code may also be intangibly stored on one or more non-transitory and non-volatile computer readable media, such as those described above. In these cases, instructions resident on the media are read and executed by a processor to perform various functions.

The above description is intended to be illustrative, and not restrictive. For example, the above-described examples (or one or more aspects/configurations thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it should not be used to interpret or limit the scope or meaning of the claims.

Also, in the above Detailed Description, various features may be grouped together to streamline the disclosure. However, the claims cannot set forth every feature disclosed herein, as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the claims, along with the full scope of equivalents to which such claims are entitled.

The invention claimed is:

1. A computer-implemented method for operating a digital inventory system, the method comprising:
receiving on a user-programmable interval, from an imaging device located at a user location, an image comprising an object;
performing object recognition on the image to determine an object type of the object;
determining, with at least one hardware processor of the digital inventory system, when the object is to be added to an inventory database that resides in a memory of the digital inventory system based on inventory rules stored in the memory of the digital inventory system;
adding the object to the inventory database making the object an inventory object;
displaying, on a computer display, an input indication for selection by the user;

receiving the input indication from the user, wherein the input indication includes a numerical input on a scale from zero to ten to reflect sentimental value of the object to the user;

calculating, with the at least one hardware processor, a numerical value of the inventory object based on the numerical input, tax consequences of a sale of the inventory object, and valuation information related to other objects of a same or similar object type;

associating, with the at least one hardware processor, the numerical value and metadata with the inventory object, the metadata including prospective object buyer data, a note describing a user description of a memory of the object, and care instructions for the object;

displaying the inventory object along with the numerical value, the metadata and the object type on the computer display;

receiving a designation of a beneficiary for the inventory object from the user;

identifying a prospective buyer of the inventory object based on the metadata; and providing a virtual reality interface to the user or the designated beneficiary, the virtual reality interface providing a depiction of the displayed inventory object, a listing of the designated beneficiary of the inventory object overlaid or near the object, and a listing of the prospective buyer of the inventory object overlaid or near the object.

2. The method of claim 1, further comprising:
receiving, from an input of the at least one hardware processor, a transferee identifier;
receiving, from the input of the at least one hardware processor, association information that indicates an association between the transferee identifier and the inventory object; and
storing the association information with the inventory object to associate the inventory object and the transferee identifier in the memory.

3. The method of claim 2, further comprising:
authenticating a transferee based on authentication information received from the transferee;
providing access to the inventory object by the transferee having the transferee identifier associated with the inventory object; and
displaying the inventory object on a display of the transferee.

4. The method of claim 2, further comprising:
sending a notification over a network to a transferee associated with the transferee identifier when the association information for the inventory object has been stored.

5. The method of claim 2, further comprising:
determining balancing information for balancing total asset values for each of a plurality of transferees; and
providing reallocations of inventory objects to different ones of the transferees based on the determined balancing information.

6. The method of claim 1, wherein the inventory rules include indicating that the object is to be added based on the type of the object.

7. The method of claim 1, wherein:
the image is a first image;
the method further comprising:
receiving, from the imaging device, a second image comprising the object after a predetermined amount of time has passed;

wherein the inventory rules include indicating that the object is to be added based on the object being present in the second image.

8. The method of claim 1, further comprising:
creating or updating a set of transfer instructions from the inventory object and an associated transferee identifier.

9. The method of claim 8, further comprising:
receiving transfer instruction metadata and storing it in the memory; and
tagging, in the memory, the transfer instructions with the transfer instruction metadata.

10. The method of claim 8, wherein:
the transfer instructions are part of a digital will;
the inventory object is an asset of a transferor;
the transferor is a benefactor of the digital will; and
the transferee is a beneficiary the asset.

11. The method of claim 1, further comprising:
receiving object metadata related to the inventory object after it has been added to the inventory database;
associating and storing the object metadata with the inventory object; and
utilizing the object metadata in the determining of the value.

12. The method of claim 11, wherein the object metadata includes a sentimental value.

13. The method of claim 11, wherein the object metadata includes prospective object buyer data or tax related data.

14. The method of claim 1, wherein the determining of the value comprises:
accessing merchant, sale, auction, or appraisal information over a network.

15. The method of claim 1, wherein the displaying of the inventory object is provided by way of a dashboard.

16. A system for operating a digital inventory, comprising:
at least one hardware processor;
a storage device comprising a nonvolatile memory and connected to the hardware processor, the storage device comprising an inventory database;
an imaging device located at a user location and connected to the hardware processor and the storage device;
wherein the hardware processor comprises instructions that, when executed on the hardware processor, cause the system to:
receive on a user-programmable interval, from the imaging device, an image comprising an object;
perform object recognition on the image to determine an object type of the object;
determine when the object is to be added to the inventory database based on inventory rules stored in the storage device, wherein the instructions cause the system to add the object to the inventory database making the object an inventory object;
display, on a computer display, an input indication for selection by the user;
receive the input indication from the user, wherein the input indication includes a numerical input on a scale from zero to ten to reflect sentimental value of the object to the user;
calculate a numerical value of the inventory object based on the numerical input, tax consequences of a sale of the inventory object, and valuation information related to other objects of a same or similar object type;
associate the numerical value and metadata with the inventory object, the metadata including prospective object buyer data, a note describing a user description of a memory of the object, and care instructions for the object;

display the inventory object along with the numerical value, the metadata and the object type on the computer display;

receive a designation of a beneficiary for the inventory object from the user;

identify a prospective buyer of the inventory object based on the metadata; and provide a virtual reality interface to the user or the designated beneficiary, the virtual reality interface providing a depiction of the displayed inventory object, a listing of the designated beneficiary of the inventory object overlaid or near the object, and a listing of the prospective buyer of the inventory object overlaid or near the object.

17. The system of claim 16, wherein the processor further causes the system to:

receive, from an input of the at least one hardware processor, a transferee identifier;

receive, from the input of the at least one hardware processor, association information that indicates an association between the transferee identifier and the inventory object; and store the association information in the memory with the inventory object to associate the inventory object and the transferee identifier.

18. The system of claim 17, wherein the processor further causes the system to:

authenticate a transferee based on authentication information received from the transferee;

provide access to inventory object by the transferee having the transferee identifier associated with the inventory object; and display the inventory object on a display of the transferee.

19. A non-transitory computer-readable storage medium, the computer-readable storage medium including instructions that when executed by at least one hardware processor, cause the processor to:

receive on a user-programmable interval, from an imaging device located at a user location, an image comprising an object;

perform object recognition on the image to determine an object type of the object;

determine when the object is to be added to an inventory database stored in a non-volatile memory based on inventory rules stored in a storage device, wherein the instructions cause adding the object to the inventory database making the object an inventory object;

display, on a computer display, an input indication for selection by the user;

receive the input indication from the user, wherein the input indication includes a numerical input on a scale from zero to ten to reflect sentimental value of the object to the user;

calculate a numerical value of the inventory object based on the numerical input, tax consequences of a sale of the inventory object, and valuation information related to other objects of a same or similar object type;

associate the numerical value and metadata with the inventory object the metadata including prospective object buyer data, a note describing a user description of a memory of the object, and care instructions for the object;

display the inventory object along with the numerical value, the metadata and the object type on the computer display;

receive a designation of a beneficiary for the inventory object from the user;

identify a prospective buyer of the inventory object based on the metadata; and provide a virtual reality interface to the user or the designated beneficiary, the virtual reality interface providing a depiction of the displayed inventory object, a listing of the designated beneficiary of the inventory object overlaid or near the object, and a listing of the prospective buyer of the inventory object overlaid or near the object.

20. The medium of claim 19, wherein the instructions further cause the processor to:

receive, from an input of the at least one hardware processor, a transferee identifier;

receive, from the input of the at least one hardware processor, association information that indicates an association between the transferee identifier and the inventory object; and store the association information in the memory with the inventory object to associate the inventory object and the transferee identifier.

* * * * *

UNITED STATES PATENT AND TRADEMARK OFFICE
CERTIFICATE OF CORRECTION

PATENT NO. : 11,238,406 B1  
APPLICATION NO. : 15/672838  
DATED : February 1, 2022  
INVENTOR(S) : Zhuo et al.

Page 1 of 1

It is certified that error appears in the above-identified patent and that said Letters Patent is hereby corrected as shown below:

In the Claims

In Column 16, Line 16, in Claim 19, after "object", insert --,--

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*